(12) United States Patent
Lee et al.

(10) Patent No.: US 10,983,965 B2
(45) Date of Patent: Apr. 20, 2021

(54) DATABASE MEMORY MANAGEMENT IN A HIGH AVAILABILITY DATABASE SYSTEM USING LIMITS

(71) Applicant: SAP SE, Walldorf (DE)

(72) Inventors: Chul Won Lee, Seoul (KR); Daniel Booss, Wiesloch (DE); Jaeyoung Choi, Seoul (KR); Werner Thesing, Lauteral (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/544,739

(22) Filed: Aug. 19, 2019

(65) Prior Publication Data

US 2019/0370232 A1 Dec. 5, 2019

Related U.S. Application Data

(62) Division of application No. 15/444,403, filed on Feb. 28, 2017, now Pat. No. 10,503,705.

(51) Int. Cl.
*G06F 12/00* (2006.01)
*G06F 3/06* (2006.01)
*G06F 16/21* (2019.01)

(52) U.S. Cl.
CPC .................................. *G06F 16/21* (2019.01)

(58) Field of Classification Search
CPC .... G06F 9/5072; G06F 9/544; G06F 11/0757; G06F 11/1435; G06F 11/1471; G06F 11/1474; G06F 11/2035; G06F 11/2097; G06F 16/21; G06F 16/2365; G06F 16/273; G06F 2201/855

See application file for complete search history.

(56) References Cited

U.S. PATENT DOCUMENTS

2012/0144407 A1* 6/2012 Hacigumus ........... G06F 9/5072
719/328

* cited by examiner

*Primary Examiner* — Yong J Choe
(74) *Attorney, Agent, or Firm* — Jones Day

(57) ABSTRACT

Receiving a statement including requests for database operations in a secondary database system storing data replicated from a primary database system by replaying transaction output generated by the primary database system; responsive to receiving the statement, requesting an allocation of memory from the secondary database system to support the requested database operations; generating an aggregated statement memory consumption value based on the amount of memory consumed by all statements executing in the secondary database system that are not associated with replaying the transaction logs; determining that the requested allocation of memory in addition to the aggregated statement memory consumption value exceeds a total statement execution memory limit indicating a total amount of memory that may be allocated to all database operations associated with statement execution in a secondary database system, and denying the requested allocation of memory. Related apparatus, systems, techniques and articles are also described.

18 Claims, 9 Drawing Sheets

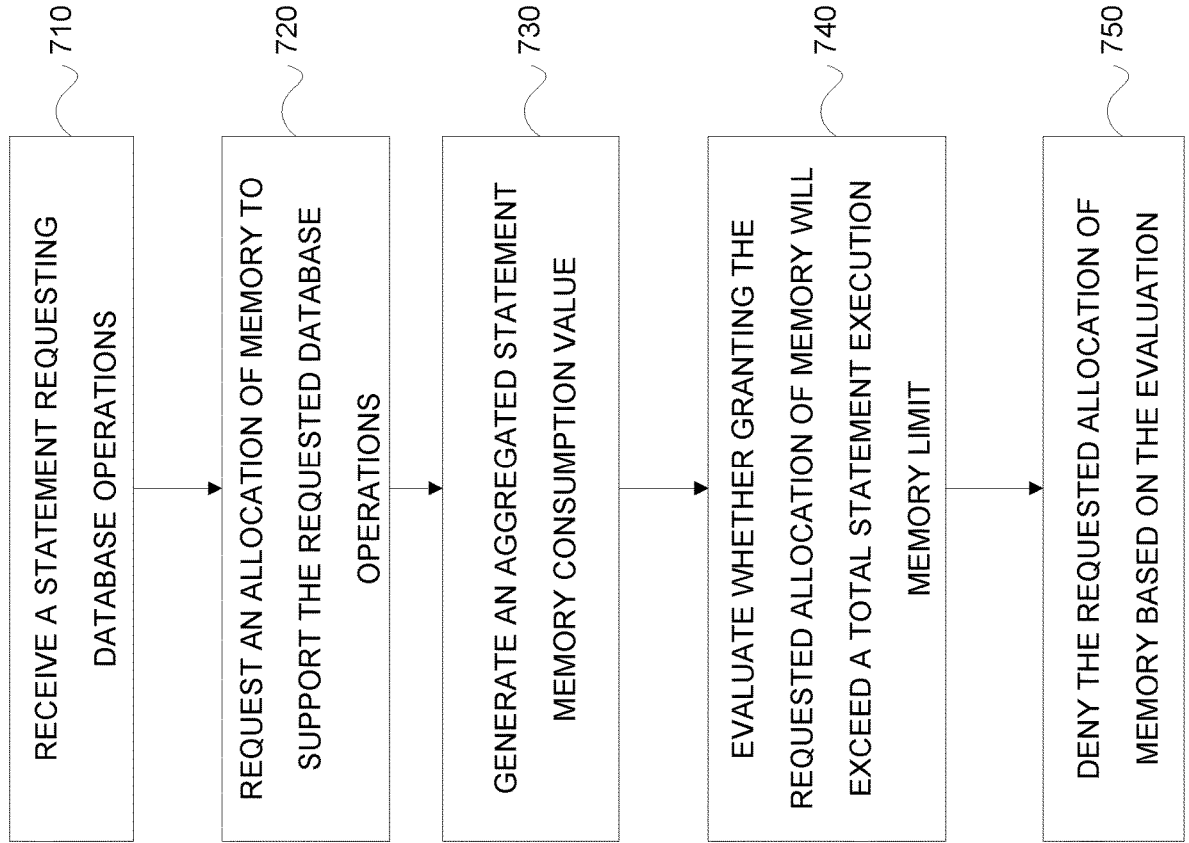

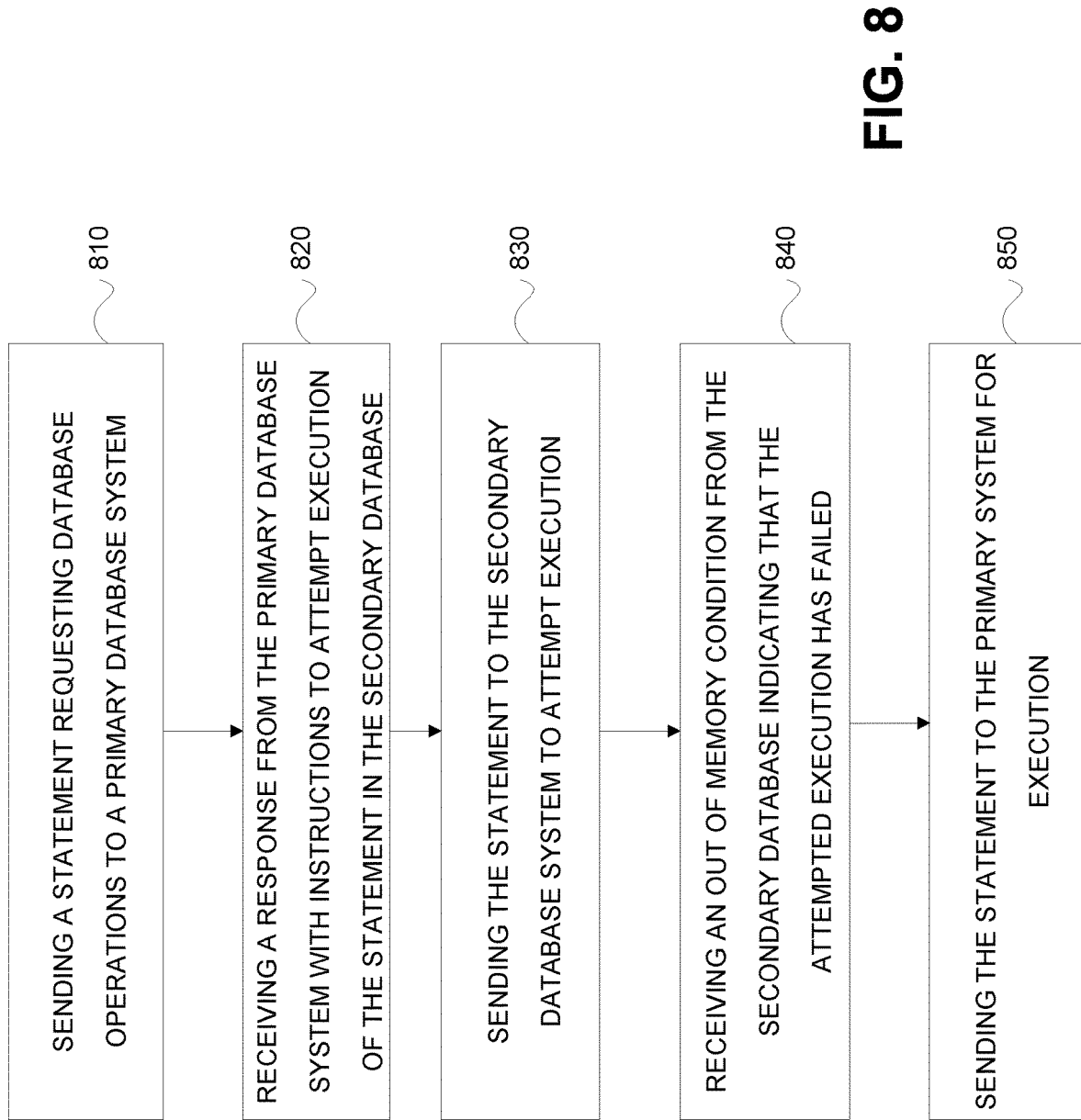

DATABASE MEMORY MANAGEMENT IN A HIGH AVAILABILITY DATABASE SYSTEM USING LIMITS

CROSS-REFERENCE TO RELATED APPLICATION

This application is a divisional under 35 U.S.C. § 121 of U.S. patent application Ser. No. 15/444,403, filed Feb. 28, 2017 and entitled "Database Memory Management in a High Availability Database System Using Limits," the entire contents of which is incorporated by reference herein.

TECHNICAL FIELD

The subject matter described herein relates to database systems and more particularly to database systems employing a primary database and a secondary, hot-standby, database.

BACKGROUND

A database system includes a database and a database management system (DBMS). A database is an organized collection of data. A DBMS comprises computer software that executes on one or more processors and interacts with users, other applications, and a database to capture and analyze data. A DBMS may allow for the definition, creation, querying, update, and administration of databases.

Database systems rely on data replication and synchronization to maintain continuous system availability. Typically, in such a system, a complete copy of the database is stored at a first datacenter and the same complete copy of the database is stored at a second datacenter. The first and second datacenters may be in different locations or they may be in the same location. Since the data in the second datacenter needs to be the same as the data in the first datacenter, a synchronization mechanism is typically employed to handle synchronization of the data. If there is a failure associated with the first datacenter, the system can switch to using the database at the second datacenter without significant issues.

Since the second datacenter may be asked to perform all of the same tasks as the first datacenter, typically, the second datacenter has the same hardware and software requirements as the first datacenter. Sometimes more than two datacenters may be included within a database.

SUMMARY

In a first aspect, a statement is received that includes requests for database operations in a secondary database system where the secondary database system stores data replicated from a primary database system. Primary database system data updates are replicated by replaying transaction logs containing output generated by the primary database system while executing database operations. Responsive to receiving the statement, a process requests an allocation of memory from the secondary database system to support the requested database operations. Subsequently, an aggregated statement memory consumption value is generated based on the amount of memory consumed by all statements executing in the secondary database system that are not associated with replaying the transaction logs. A determination is then made that the requested allocation of memory in addition to the aggregated statement memory consumption value exceeds a total statement execution memory limit, which indicates a total amount of memory that may be allocated to all database operations associated with statement execution in a secondary database system, and the requested allocation of memory is denied.

The statement requesting database operations can be received from a client application of a primary database system that is engaged in a load balancing operation with the secondary database system, and responsive to denying the requested allocation, the first statement can be routed to a client application with information indicating that the statement is to be routed to the primary database system. Sometime later, the secondary database system can de-allocate memory associated with a completed statement, and then receive another statement including an additional request for database operations in the secondary database system. Then a request for a second allocation of memory can be made of the secondary database system, and, a second aggregated statement memory consumption value can be generated based on the amount of memory consumed by all statements executing at the secondary database system that are not associated with replaying the transaction logs. Based on a second aggregated statement memory consumption value, it can be determined that the requested second allocation of memory in addition to the second aggregated statement memory consumption value does not exceed a total statement execution memory limit value; and an allocation of memory can be made to a thread or process for executing requested database operations. When the allocation is made, a statement memory limit object can be passed to the executing thread or process. Such a limit object can include a total statement execution memory limit value, and an allocation value indicating the memory allocated to the thread or process.

The requested database operations can then be executed, and during execution it may be detected that the thread requires an increased memory allocation. In such aspects, it can be determined, based on a limit object, that an increased memory allocation will not cause the aggregated statement memory consumption value to exceed the total statement execution memory limit value, and the requested increased memory allocation can be granted. Responsive to allocating the increased allocation, the allocation value of the statement memory limit object can be updated by generating a new aggregated statement memory consumption value accounting for the increased memory allocation and replacing the aggregated statement memory consumption value with the new aggregated statement memory consumption value.

A plurality of additional threads can be executing and each additional thread can execute database operations requested by a plurality of statements, and each of the additional threads can be allocated allocating memory including passing each additional thread a pointer to a statement memory limit object. A database replication execution memory limit value can also be generated to indicate the total amount of memory allocated to replicating the primary database system in the secondary database system by replaying transaction logs containing output generated by the primary database system. This database replication execution memory limit value may be fifty percent of total system memory at the secondary database system, but this value can also be tailored to needs of the system.

It can also be detected that the replication of the primary database system based on the transaction logs of the primary database system requires additional memory. A new total amount of memory that may be consumed by database operations associated with statements executing in the secondary database system can then be generated based on an additional amount of memory required by replicating the secondary database system. When the new total amount of memory is generated, a total statement execution memory limit parameter can be updated with a new total amount of memory that may be consumed by database operations associated with statements executed in the secondary database system.

The replication of a primary database system based on replaying transaction logs containing output generated by the primary database system may include receiving database transaction log containing output generated by a primary database system while the primary database system was previously executing client application requested database operations. These client application requested database operations may be in the form of statements. These client requested database operations can cause the primary system processes to output data in database transaction logs, which can then be replayed to replicate database operations in a secondary database system.

Replicating the client requested database operations can cause replication statements to be executed by a secondary database system. These replicated statements may be handled by a plurality of threads having that may have associated replication memory allocations. Memory allocated to statements not associated with replicating a primary database system based on transaction logs can be managed by a limit object that may exclude memory allocated to replicated statements. A memory allocation report can be generated to contain an association between each statement executing in a database system and each respective memory allocation, and may also contain a generated aggregated statement memory consumption value.

In an interrelated aspect, a statement requesting database operations is sent to a primary database system that is engaged in load balancing operations with a secondary database system. Subsequently, a response is received from a primary database system including information instructing that a secondary database system is to attempt to execute the statement, and the statement is sent to the secondary database system. Then, an out of memory condition is received from a secondary database system indicating that the secondary database system has exhausted its memory allocated to executing statements, the statement is sent to the primary database system for execution. A statement requesting database operations can initially be sent to the primary system responsive to a client application of a database of the first database system. Such a statement, may also be generated responsive to a DBMS application. And, a statement may also be generated to include associated routing information to indicate that such a statement may be load balanced. This routing information may further include one or more conditions that should be satisfied before the statement is routed or load balanced.

In interrelated aspects, a plurality of statements are executed in a primary database system, causing output from a plurality of database operations associated with the plurality of statements to be generated. The output is sent to a secondary database system for replication thereby enabling that secondary database system to support load balancing operations of the primary database system. A client application statement is then received that requests additional database operations. The client application statement is then routed to the secondary database system to be executed in support of the load balancing operations. Subsequently, an out of memory condition is received that indicates that the secondary database system has consumed all memory resources allocated to load balancing operations, then the additional database operations requested by the client application statement are executed in the primary database system. The secondary database system memory allocated to statement execution can be limited by a minimum amount of memory allocated to the replication processes.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. As an example, the subject matter described herein may provide increased average throughput for a database system during high workloads by enabling effective load balancing techniques for balancing the workload of a primary system with a backup database system. Protecting the amount of system resources available to replaying transaction logs at the secondary database or a backup database system may be maintained in a near current state with respect to a primary system that is under continuous use by one or more applications or users. Guaranteeing a minimum amount of system memory ensures that the log reply speed at the backup system can sustain the pace of log generation speed of a primary system under write-intensive workloads. By enabling near current and consistent transactional visibility of transactions that are replicated from a primary database the secondary database is able to assume a portion of the workload of a primary database system while also providing meaning returns in support of that workload. Without protecting system resources allocation to the replication processes, memory allocation to an intensive workload will may degrade the replication processes thereby causing a substantial delay between an update in the primary system and when that update is replicated in the secondary, or backup, system, and may make the secondary, or backup, database system ineffective in providing support to load balancing operations. The subject matter described herein allows a computer system to maintain consistent and useful, near-current, data visibility by a secondary database while data is updated and table structures are modified while concurrently replicating the of data the primary database system in the secondary database system.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 7 is a process flow diagram illustrating responding to memory allocation requests in a database system; and FIG. 8 is a process flow diagram illustrating requesting database operations from a database system employing memory limitations in a load balancing configuration.

FIG. 9 is a process flow diagram illustrating routing of statements requesting database operations from a database system employing memory limitations in a load balancing configuration.

Like reference symbols in the various drawings indicate like elements.

DETAILED DESCRIPTION

Figure 1:
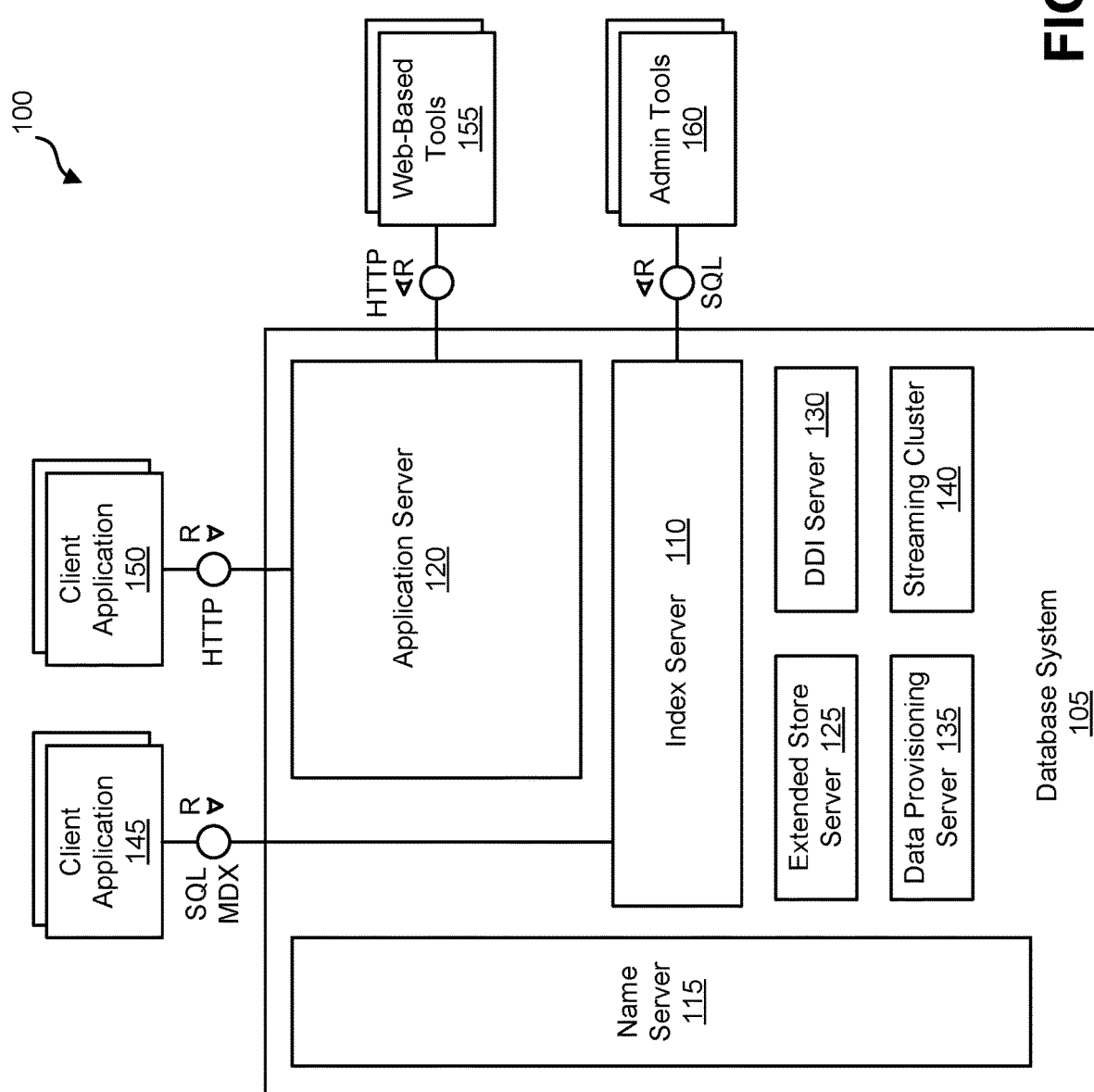
FIG. 1 is a system diagram illustrating an example database system for use in connection with the current subject matter.

The current subject matter is directed to enhanced techniques for memory management when load balancing a workload between two systems, for example when such load balancing is executed concurrently with replay of database operations using, for example, a redo log.

A database or database system may be represented as a table or a set of tables, the tables containing data in rows and/or columns. In a row based database, data in a table may be stored and organized by rows. Alternatively, data in a table may also be stored and organized by columns and such a database is called a column oriented database or a columnar database. Column oriented databases typically make more efficient use of storage by replacing redundant data with a pointer. One example of a database system is SAP HANA®. SAP HANA® is a column oriented relational database system. SAP HANA® is also an in-memory database (IMDB) in which the data associated with the database is stored in main memory instead of disk storage so it may be accessed more quickly. IMDB systems are generally column oriented databases since column oriented databases make more efficient use of the expensive main memory.

Some databases may utilize replication to improve reliability and availability of the database. If data replication is implemented, the database system may include a first datacenter and a second datacenter. The first datacenter may include a processor and memory sufficient to store the data associated with the database. The first datacenter may store a first (primary) copy of the data associated with the database. The second datacenter may also include a processor and memory sufficient to store the data associated with the database. The second datacenter may store a second (e.g., backup or redundant or replica) copy of the data associated with the database. In some implementations, the database may include more than two datacenters (e.g., three or four datacenters). In some implementations, either one or both of the databases is a distributed system or a single server system.

To better utilize the second (and subsequent) datacenter, some database systems, such as SAP HANA®, may simultaneously utilize the first datacenter and the second datacenter. In this mode of operation, the first datacenter may be configured to delegate queries to the second datacenter to balance the load between the two systems. Such a situation may be referred to as Active/Active (AA) operation since the first datacenter and the second datacenter both actively respond to queries, or statements, at the same time by executing database operations responsive to the queries, or statements, in order to provide a response, or return. In some implementations only certain types of queries, or statements, may be responded to, or alternatively executed, by the first datacenter or the second datacenter.

In some implementations such balancing may only occur when conditions of the first datacenter and the second datacenter are satisfied. The second data center may replicate the first database of the first database center in a second database of the second data center, and load balancing may only occur when a time delay between the two data centers is sufficiently small, or when a delay in the replication processes at the second datacenter is sufficiently small. In some implementations, the replication processes may take priority over the ability of one or more datacenters to support the load balancing operations.

When two or more datacenters or two or more database systems are engaged in load balancing operations, a client application, reliant on a database maintained by the first database system and replicated in the second database system, may restrict execution of queries to either the first database system or the second database system. In such a system, the client application may modify a query, or package a query, with additional routing information identifying which database may execute the query and under what conditions.

In some embodiments the client may dispatch or issue or transmit its queries directly to the database system it wants to obtain a response or return from. In other embodiments one or more processes at the client application, the first database system, or the second database system inform the client application which system will execute the statement or query. In other embodiments, the client application always issues its statements or queries to the first database system. The first database system includes various processes, in a standalone server or in a server providing other database services, that support the load balancing operations by maintaining state data, or having access to such state data, and making determinations as to whether the statement will be executed in the first database system or the second database system. In various embodiments, these determinations are made entirely within a client system. If the load balancing processes determine that the statement may be executed by the second database system, statement is routed back to the client application with an indication that the statement is to be executed in the database of second database system, that may be a backup or replica of the database of the first database system. Then the client issues the query to the second database system for execution, and such execution can be contingent upon certain conditions.

The subject matter described herein discloses apparatus, systems, techniques and articles that may provide increased average throughput capabilities for a database system during high workloads to reduce the likelihood that a request to the database system for data may be queued, buffered or rejected until sufficient system resources are available to complete the request. In some examples, apparatus, systems, techniques and articles disclosed herein utilize secondary, backup, or replicated, database systems to execute queries to reduce the workload of a primary database system, without interfering with database replication processes, thereby preserving and protecting the availability of the backup or secondary database.

When a secondary, or backup, database system serves the purpose of HA/DR functionality, an apparatus, system, technique or article that utilizes a secondary, backup database system to increase throughput of a workload on a primary database system must not interfere with the HA/DR functionality of the backup system. The use of the backup database system to increase throughput must also maintain the backup database in substantially the same state as the primary database. In the event of primary database system failure, the backup database can assume the role of the primary database in as little time as possible. Therefore, transactions replicated, or mirrored, to the secondary database must be as close to current as possible. But, under heavy write-intensive workloads, replay of transactions executed in the primary by replay of transaction logs may consume substantial memory resources. Therefore, it is desirable to limit the memory available to load balancing operations at the secondary, replicated, or backup, database system. It is also desirable to allocate a minimum amount of memory resources to the database replication processes. Also, in order enable functional load balancing, statements routed to the backup database system that encounter an out of memory condition, due to the limitation on memory available to load balancing operations, should be routed back to the client or the primary database system with an indication that the statement was not executed due to the out of memory condition.

FIG. 1 is a diagram 100 illustrating a database system 105 that can be used to implement aspects of the current subject matter. The database system 105 can, for example, include an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also hosts the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
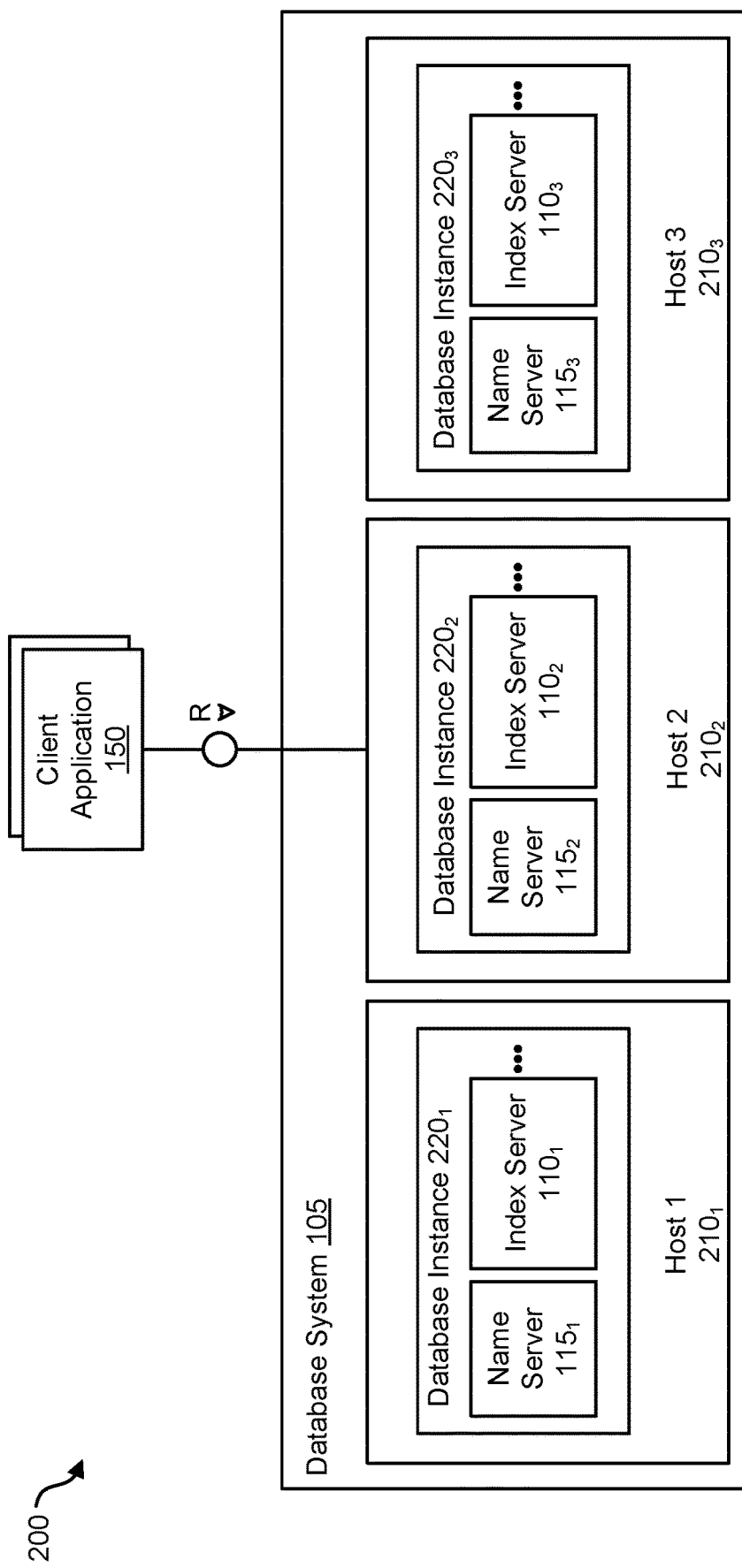
FIG. 2 is a system diagram illustrating an example database system that can support distribution of server components across multiple hosts for scalability and/or availability purposes for use in connection with the current subject matter.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
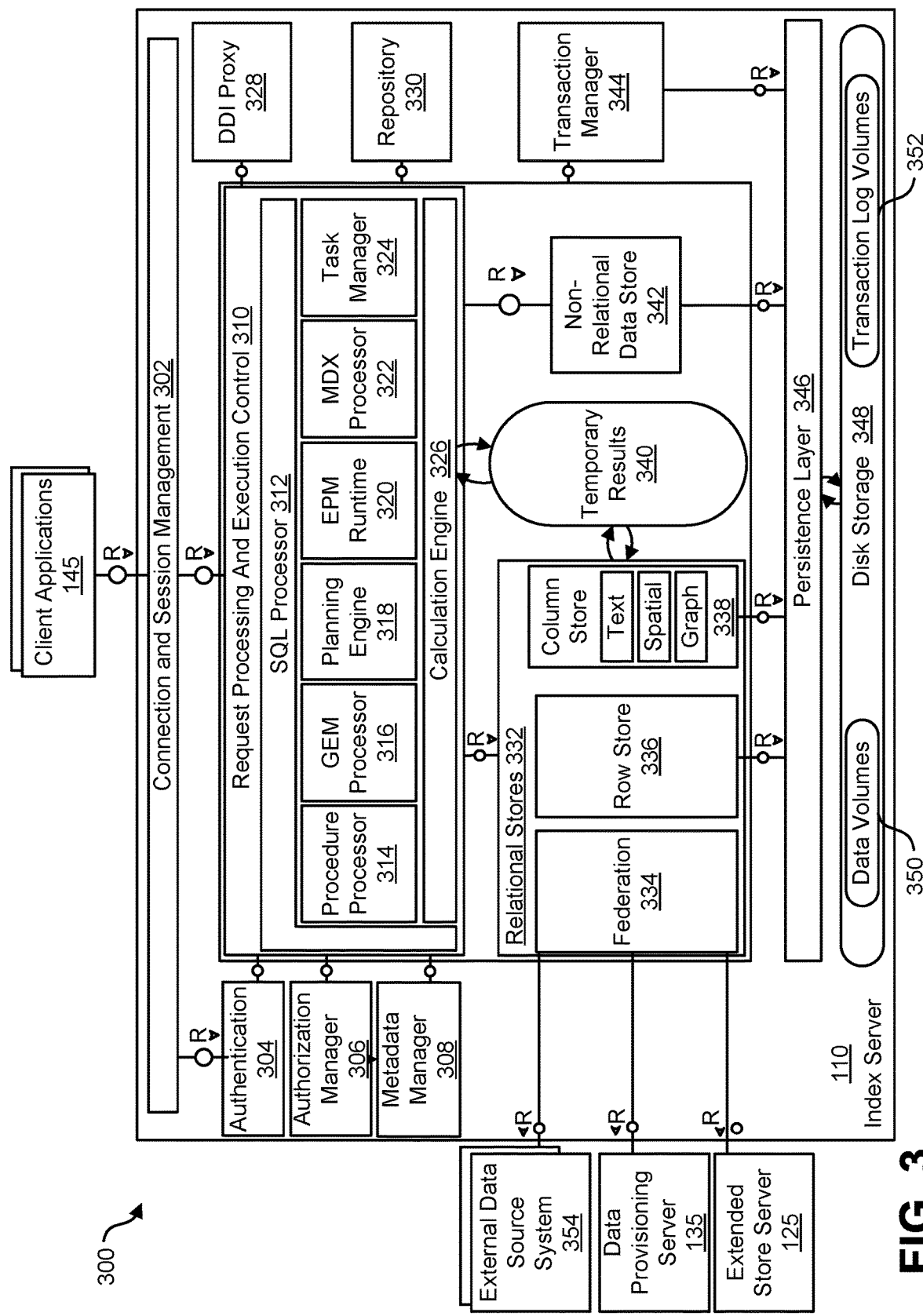
FIG. 3 is a diagram illustrating an architecture for an index server for use in connection with the current subject matter.

FIG. 3 is a diagram 300 illustrating an architecture for the index server 110 (which can, as indicated above, be one of many instances). A connection and session management component 302 can create and manage sessions and connections for the client applications 150. For each session, a set of parameters can be maintained such as, for example, auto commit settings or the current transaction isolation level.

Requests from the client applications 150 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 150 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 150 using the same network communication protocol. GEM statements can be sent using a built-in SQL system procedure.

The index server 110 can include an authentication component 304 that can be invoked with a new connection with a client application 150 is established. Users can be authenticated either by the database system 105 itself (login with user and password) or authentication can be delegated to an external authentication provider. An authorization manager 306 can be invoked by other components of the database system 150 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 150 can be e received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can stores relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can stores relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persisted data and it can also contain a logger component that manages a transaction log. Transaction log entries can be written in the persistence layer 352 (e.g., in transaction log volumes 352) explicitly by using a log interface or implicitly when using the virtual file abstraction. The transaction log volume 352 can include redo logs which specify database operations to be replayed as well as undo logs which specify database operations to be undone.

The persistence layer 236 stores data in persistent disk storage 348 which, in turn, can include data volumes 350 and/or transaction log volumes 352 that can be organized in pages. Different page sizes can be supported, for example, between 4k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

In many applications, data systems may be required to support operations on a 24/7 schedule, and data system providers may be required to guarantee a maximum amount of downtime, that is time during which a system is not able to fully support ongoing operations. When a system is required to ensure an agreed level of operational performance, it may be referred to as a high availability system ("HA"). One solution to guarantee substantially continuous uptime with no, or very little, downtime is to maintain one or more hot-standby systems. A hot-standby system, or a backup system, is a system that may be activated quickly in the event of a disruption causing one or more functions of a primary operational data system to fail. Such a disruption may be referred to as a disaster, and the process of restoring a data system to full operations may be referred to as disaster-recovery ("DR").

A hot-standby system may be an exact replica of a primary operational system that is capable of providing all the functions provided by the primary operational system, or a hot-standby may be a system that is capable of providing a minimum amount of essential functionality during the time required to restore the primary operational data system. The time it takes after a disaster to restore full, or minimum, functionality of a data system, for example by bringing a hot-standby online, is referred to as recovery time. In an effort to minimize recovery time, and thereby downtime, a hot-standby system is typically in a state just short of fully operational. For example, a system architecture may be implemented in which all functional systems of the hot-standby are active and operational, and all system and data changes or updates occur in the primary operational system and the hot-standby at the exact same time. In such a case the only difference in the two systems may be that the primary is configured to respond to user requests and the secondary is not. In other hot-standby systems one or more functions may be disabled until mission critical systems of the hot-standby are observed to be operating normally, at which time the remaining functions may be brought online.

In many applications, data systems may be required to provide prompt responses to users and applications that rely on the data managed by the data system. Providers and designers of data systems may be required to guarantee a minimum average throughput over time, or an average maximum response time. The speed with which a data system responds to a request from a user or an application may be dependent on many factors, but all systems are limited in the number of requests they can handle in a given period of time. When a data system manages a relatively large amount of data, and supports a relatively large number of users or applications, during high workloads a request may be queued, buffered or rejected until sufficient system resources are available to complete the request. When this happens, average throughput goes down and average response time goes up. One solution to such a problem is to distribute the workload across multiple processing systems. This is known as load balancing.

One drawback to load balancing and HA systems is that they may require additional processing systems, which in turn have a high cost. It is often the case with certain data systems supporting critical functions of an organization that additional systems are needed to perform both load balancing and HA functionality to efficiently support continuous operations. Given the redundant nature of DR systems, they are often left undisturbed unless a disaster occurs. Thus, in some circumstances, it is desirable to implement and maintain a combination high availability/disaster recovery (HA/DR) system with load balancing that includes both a primary operational system and a hot-standby system, and potentially one or more tertiary systems. Such a combination system allows for load balancing of workload between the processing systems of both the primary operational system and the hot-standby system, without disrupting the ability of the HA/DR system to assume primary functionality in the event of a disaster.

Figure 4:
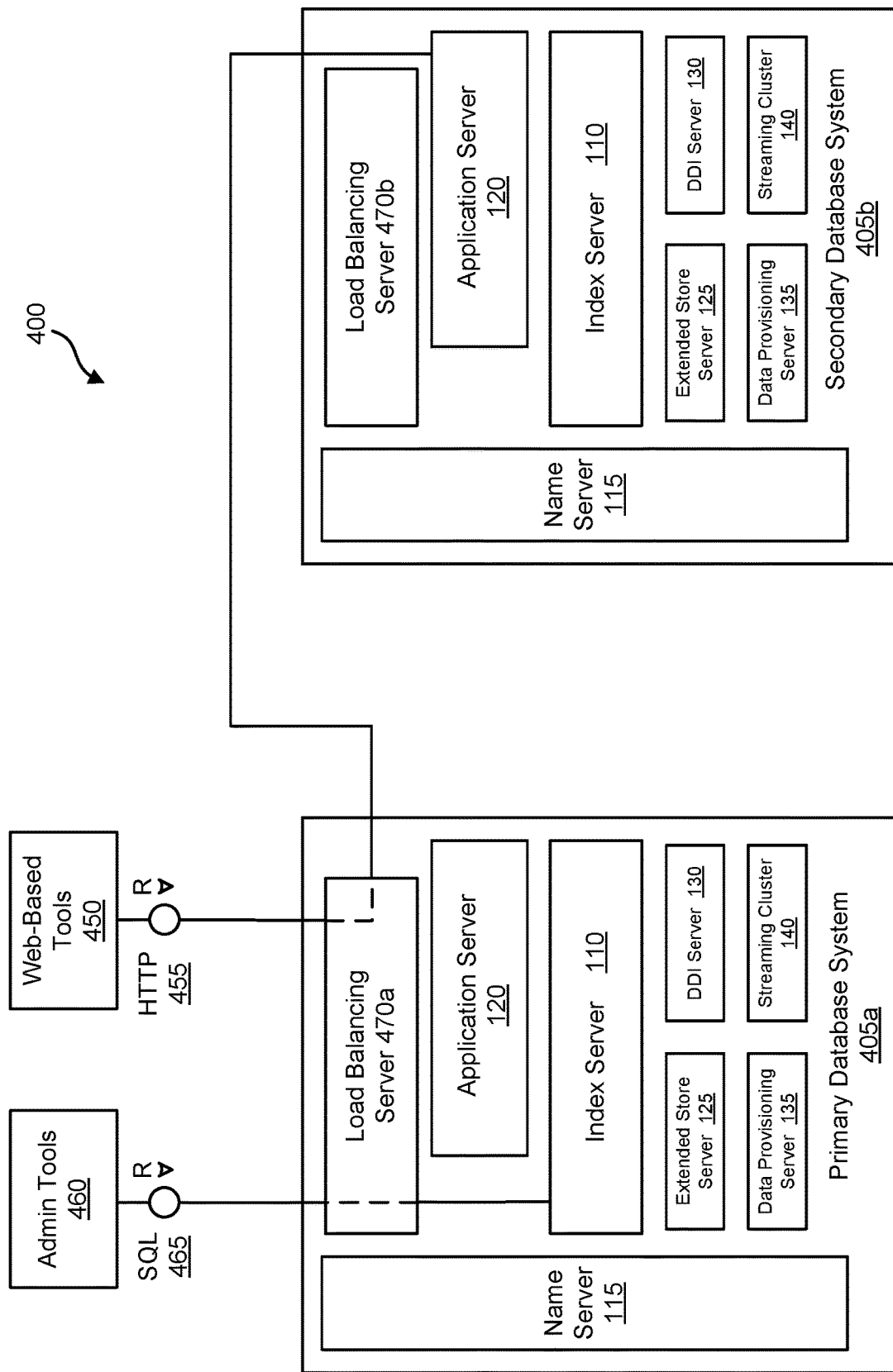
FIG. 4 is a functional flow diagram illustrating an architecture to support load balancing between a primary database system and a secondary database system.

FIG. 4 is a functional flow diagram illustrating an architecture 400 to support load balancing between a primary database system, or primary system 405a and a secondary database system, or secondary system 405b, which serves as hot-standby to primary system 405a. Each of the primary system 405a and the secondary system 405b may be a single instance system, similar to database system 105 depicted in FIG. 1, or each may be a distributed variation of database system 105 as depicted in FIG. 2. Such an architecture 400 may be useful in a high availability data system, or in a disaster recovery system, or in a combination HA/DR system.

Each of the primary system 405a and secondary system 405b may include a load balancing functionality. Such load balancing functionality may for example be contained within a distinct load balancing server 470a or 470b. But, such load balancing functionality may be managed by any suitable processing system. For example, the application server 120 of the primary system may also manage the load balancing of requests issued to the application server of the primary system 405a, sending requests to the secondary system 405b as necessary to maintain a well distributed workload. The various load balancing processes operating in server 470a or 470b may be components of a larger DBMS system for managing the primary system 405a and secondary system 405b.

As depicted in FIG. 4, each of the primary system 405a and the secondary system 405b includes a load balancing server 470a and 470b which respectively receive requests from user applications directed to the primary system 405a or the secondary system 405b. Such request may come from either admin tools 460 or web-based tools 450, or any other user application. Upon receiving a request a load balancing server, e.g. 470a, determines how to distribute the workload. As depicted load balancing server 470a routes an SQL request 465 from admin tools 460 to the index server 110 of the primary system 405a, while routing an HTTP request 455 from web-based tools 450 to the application server 120 of the secondary system 405b.

Load balancing of resources between a primary system 405a and a secondary system 405b can give rise to a number of complicating issues. For example, if either of the requests 455, 465 requires writing to one or more data tables, or modifying a data table, then the two systems 405a, 405b will diverge. After many instances of write requests being distributed between the primary system 405a and the secondary system 405b, the two systems would be substantially different, and likely unusable. In another example, an application request, e.g. 465, may perform a write transaction that is followed by a read transaction, e.g. 455, related to the data written by the write request 465. If the write request is allocated to the primary system 405a, the read request would obtain a different result depending on whether the subsequent read transaction is carried out by the primary system 405a or by the secondary system 405b.

Load balancing in a HA/DR system, by distributing a portion of the workload of a primary data system to a hot-standby or backup system must be done in a way that does not disturb the principal purpose of the backup system, which is to substantially eliminate downtime in a high availability system by enabling quick and efficient recovery of operations. In other words, as a rule load balancing cannot break the hot-standby. Given this principal purpose, any solution that enables load balancing of workload between a primary system and a backup system must maintain the backup system in an identical, or nearly identical, state as the primary system. Such a solution should also avoid or prohibit any actions which may cause the state of the backup system to substantially diverge from the state of the primary system. In this way, in the event of a partial or total failure of the primary system due to disaster, the backup system can failover to a primary system mode with minimal or no impact to client applications.

Figure 5:
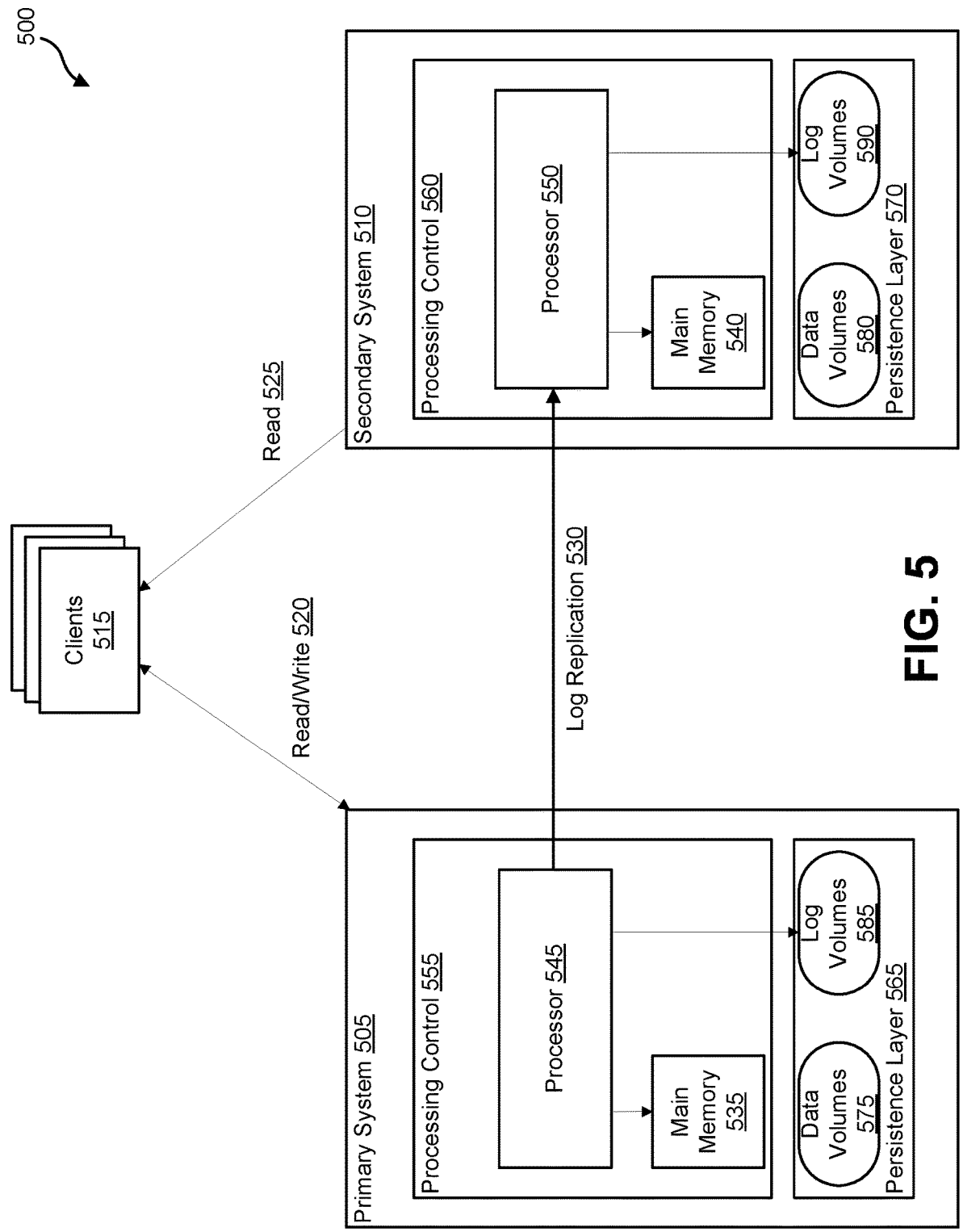
FIG. 5 is a functional flow diagram depicting one example solution to managing load balancing in a HA/DR system for use in connection with the current subject matter.

FIG. 5 depicts one possible solution to managing load balancing in a HA/DR system 500. HA/DR system 500 includes a primary system 505 and a secondary system 510 and is capable of load balancing between primary system 505 and secondary system 510 without interfering with the hot-standby functionality of the secondary system 510. Each of primary system 505 and secondary system 510 may be single instance database systems similar to database system 105 depicted in FIG. 1, or a distributed variation of database system 105 as depicted in FIG. 2. Furthermore, each of primary system 505 and secondary system 510 may comprise less, more or all the functionality ascribed to index server 110, 300, name server 115, application server 120, extended store server 125, DDI server 130, data provisioning server 135, and stream cluster 140. But, for simplicity of illustration HA/DR system 500 has been simplified to highlight certain functionality by merely distinguishing between processing control 555, 560 and a persistence layer 565, 570 of each respective system 505, 510. These various components may comprise a DBMS system for controlling the HA/DR system 500 and constitute various processes and components executing within processing control 555, 560 and the persistence layer 565, 570. The DBMS system therefore interacts and maintains with the database held in main memory 535, 540 and persisted in the persistence layer 565, 570.

A collection of clients may each maintain an open connection to both the primary system 505 and the secondary system 525. Clients 515 may interact with a database managed by the primary system 505 or the secondary system 510. Such clients may interact through client applications or through components of the DBMS system executing at the client 515. In other cases, the clients may rely on a client application library containing various processes and techniques for interacting with the database systems. For example, a client 515 maintains a read/write connection for issuing read and write statements 520 to the primary system 505 and a read only connection for issuing read statements 525 to the secondary system 510. Alternatively, client 515 may maintain a read/write connection with each of the primary system 505 and the secondary system 510, while processes within the secondary system 510 itself prohibit execution of any requests that require a write transaction upon the secondary system while it is in backup mode. In embodiments read/write statements 520 are issued to the primary database system 505, while only read statements 525 are issued to the backup, or secondary, database system 510.

In embodiments load balancing of the workload required by a client application executing at client 515 is managed by the client 515 application itself. In such cases, client applications may include portions of the functionality of workload balancing servers 470a or 470b. Alternatively, a client 515 application may submit a query request to either the primary system 505 or the secondary system 510. Process control 555, 560 load balancing processes executing on processor 545, 550 then may determine where the query should be executed and replies to the client 515 with instructions identifying which system the client 515 should issue the query to. This determination may consider resources available for statement execution in each database system 505, 510, among other conditions.

Primary system 505 may include an in-memory database in which substantially all actively used data may be kept and maintained in main memory 535 so that operations can be executed without disk I/O, which requires accessing disk storage. As statements are execute the in-memory database is updated by various database operations caused by the statement. These database operations then generate transaction logs which are shipped to the secondary system 510 for replication 530 in the secondary database system 510. Each of the processes for managing this workload consume memory 535 resources by requesting memory allocation from a memory allocator, which may be a process within process control 555. In embodiments, active applications and processes within processing control 555 cause processor 545 to read and write data into main memory 535 or to disk in the persistence layer 565. Processing control 555 applications can also cause processor 545 to generate transaction logs (e.g., redo log, undo log, cleanup log, commit logs, savepoint logs, heartbeat logs, etc.) for capturing data transactions upon the database, which processor 545 then persists in the log volumes 585. As substantially all actively used data may reside in-memory, processing control 555 may interact primarily with data held in main memory while only resorting to data volumes 575 for retrieving and writing less often used data. Additional processes within processing control 555 may be executed by processor 545 to ensure that in-memory data is persisted in persistence layer 565, so that the data is available upon restart or recovery. Similar processes are ongoing in the associated secondary database 510.

Primary system 505 may be the primary operational system for providing the various functionality necessary to support 24/7 operations for an organization. Secondary system 510 may be a hot-standby, ready to come online with minimal recovery time so as to minimize downtime. Secondary system 510 may be an identical physical system as primary system 505, and may be configured in a substantially identical manner in order to enable the secondary system 510 to provide all the same functionality as primary system 505. For example, processing control 560 may include all the same applications and functionality as processing control 555, and persistence layer 570 may include data volumes 580 and log volumes 590 that are configured in an identical manner as data volumes 575 and log volumes 585 respectively. Secondary system 510 may also include an in-memory database kept and maintained primarily in main memory 540.

Primary system 505 and secondary system 510 differ in that all requests, from client 515 or otherwise, that require a write transaction are executed only in primary system 505. Primary system 505 and secondary system 510 further differ in that all write transactions are prohibited by the secondary system 510. In order to propagate changes to the data or the underlying schema from the primary system 505 to the secondary system 510, processor 545 also replicates, 530 transaction logs directly to the process control 560 of the secondary system 510. Process control 560 includes processes that cause processor 550 to then replay the transaction logs replicated from the primary system 505, thereby replicating or mirroring the transactions or data at the secondary system 510. As transaction logs are replayed, the various transactions executed at the primary system become reflected in the secondary system 510. In order to ensure both the HA functionality and the load balancing functionality, replay of the transaction logs at the secondary system places data in main memory 540, and also persists any data committed in the primary system to persistence layer 570 to be stored by data volumes 580. Replay of the transaction logs at the secondary system 510 may also results in transaction logs being persisted in log volumes 590.

Transaction logs (e.g., redo logs, undo logs, cleanup logs, commit logs, savepoint logs, heartbeat logs, etc.) may be replicated 530 in different ways. In embodiments, a standby system is maintained in nearly the same state as the primary system, and logs may be replicated synchronously meaning that the primary system will not commit a transaction until the secondary successfully responds to the log replication. Such an arrangement slows performance of the primary system 505, 405a. Conversely, where performance of a primary system is a priority, logs may be replicated asynchronously, in which case the primary operation proceeds with committing transactions without waiting for a response. Various tradeoffs can be made between these two scenarios to achieve a proper level of performance while ensuring replication of critical data.

A secondary system in standby mode, such as secondary system 510, can only be as current as its most recently replayed transaction logs. Transaction logs are replicated and replayed at the secondary system 510 only after a transaction executes in the primary system 505. Secondary system 510, therefore, is always slightly behind an associated primary system 515. Also, there is no guarantee that a query routed to the primary system in a load balancing effort will be executed before, during or after a particular transaction log is replayed. Thus, the state of the primary system 505 and the state of the secondary system will rarely if ever be identical. But, by addressing certain concerns, secondary system 510 may be kept in a state substantially close to the same state as the primary system 505 such that the workload required by many operations can be supported by the secondary 510.

As discussed above, when a secondary, or backup, database system 405b, 510 serves the purpose of HA/DR functionality, and a load balancing operation simultaneously utilizes the secondary, backup, database system 405b, 510 to increase throughput of a workload on a primary database system, the load balancing operations must not interfere with the HA/DR functionality of the backup system. The use of the backup database system 405b, 510 by load balancing operations to increase throughput must maintain the backup database in nearly the same state as the primary database. In the event of primary database system 405b, 510 failure, the backup database 405b, 510 must be able to assume the role of the primary database in as little time as possible. Therefore, transaction replication or mirroring in the secondary database must be undisturbed as a result of assuming a portion of a load balanced workload.

In embodiments, to protect database replication processes in a HA/DR system 500, a minimum amount of system resources, for example processing control 560 resources such as processor 550 resources and main memory 540 resources, are guaranteed to the database replication processes. As discussed above, one way of performing database replication is through transaction log replication 530 in the HA/DR system 510. In embodiments processor 550 may be one or more multi-core processors. And, transaction log replication 530 is performed in parallel by multiple threads executing concurrently in multiple cores of multiple processors 550. This parallel processing of processes occurs in a system with a total amount of shared memory resources 540. This use of parallel processes to perform database replication may require a substantial amount of memory resources depending on the number of parallel threads and the amount of memory consumed by each thread during intensive workloads. In embodiments each replication tread may be allocated to a distinct core within processor 550, while statement execution processes are handled by threads or processes executing in separate and distinct cores of processor 550.

In embodiments, a backup system 510 that is supporting load balancing operations of a related primary database 505 will also allocate portions of memory to individual statements as they are received. Thus, the database replication processes compete directly with the statement execution processes for memory resources, e.g. 540. Where the in-memory database is also resident in the same memory 540 relied upon by the statement related processes, the in-memory database will also consume memory resources 540. In other embodiments, the database is resident within one or more logically or physically separate and distinct servers from the application and other DBMS servers, and so need not compete directly for processor 550 and main memory 540 resources with other processes in processor control 560. In such cases, the replication processes and statement execution processes may continue to compete for resources.

As a statement executes, for example by a processor 550 according to one or more processes within process control 560, the threads handling that execution may require additional memory resources from main memory 540, and so may make a request for additional memory allocations to handle the statement. The database system will allocate memory according to one or more memory allocation policies or algorithms, which may be stored in a persistent state in persistence layer 570 and executed by process control 560. These memory allocation policies or algorithms may be part of a DBMS operating through processes in processor control 560. As statements execute in the backup database, for example read statements 525, and portions of memory 540 are allocated to support the execution of those statements in processor 550, the memory allocations diminish the amount of memory 540 that remains available to additional received statements, other executing statements, and other executing processes within process control 560. Memory allocated to statement handling threads reduces the amount of memory 540 available to database replication threads, for example threads replaying transaction logs 530 received from the primary database system 505.

In embodiments, a limit to the amount of memory allocated to statements, e.g. read/write statements 520 or read statements 525 executing within a database system 505 or 510 is implemented. The allocation of memory may be allocated by a memory allocation process. When a statement is received, for example a read statement via read connection 525 from client 515, processes within process control 555, 560 executing on processor 545, 550 request an allocation of memory in main memory 535, 540 to support the execution of the various database operations implicated by the statement. This limit to the amount of memory that will be allocated to statement execution protects other processes within the system. For example, in the secondary database system, the limits protect the database replication processes by ensuring that a minimum amount of memory is available to the database replication processes, thereby assuring that statement execution will not interfere with the database replication processes or by extension the HA/DR functionality of the secondary database system 510.

The memory allocator, generally, may allocate memory to all the process control processes executing in processor 550. In embodiments both the primary database system 505 and the secondary database system 510 depend on a memory allocator process to manage the memory allocations of processes within processing control 545, 550 or the persistence layer 565, 570. The memory allocation process may interact directly with the physical layer of the computer processing system, or it may interact with components of an abstraction layer between the database system components and the physical layer. The abstraction layer for example may comprise a computer operating system within which the DBMS and database execute, and which exposes memory allocation functions rendering them available to the database system 505, 510 processor control 555, 560. In other embodiments the memory allocators are distinct processes within the abstraction layer with which the DBMS interacts when executing various statements or component processes.

When a request is made, the memory allocator may apply different memory allocation policies to different requests in order to determine whether or not to grant the requested allocation of memory. For example, the memory allocator may respond to a memory allocation request from a thread or process handling statement execution, and the various database system operations implicated by the statement, according to a first policy. Similarly, the memory allocator responds to a request from the in-memory database, or the database replication processes, according to a different policy.

In embodiments, a policy for allocating memory to database replication processes, for example threads executing in parallel within processor 550 to replay transaction logs from the primary database system 505, may require that a percentage of main memory 540 be reserved for database replication processes. Another policy may reserve another percentage of memory resources 540 to the in-memory database, and yet another policy may reserve a percentage of memory for statement execution. Each of these policies may independently rely on additional factors for determining whether an allocation will be granted. For example, a policy may cause the memory allocator to deny a request for allocation of memory to statement execution when the database replication processes have consumed a threshold amount of memory, while granting the same request when the database replication processes have not consumed a threshold amount of memory.

In embodiments these policies may by default cause the memory allocator to reserve fixed portions of memory during database starting up, and the allocation remain fixed during execution. When a statement execution process requests memory, the allocator process may determine whether the portion of memory reserved for statement execution has sufficient available memory, and if so a block of memory will be allocate to the statement and reserved for executing the statement within the reserved portion. Upon allocation by the allocator, a pointer to the block is be passed to the process managing execution of the statement. The block of memory may be a range of memory or multiple non-continuous ranges. When execution of a statement requires additional memory, a subsequent request to the allocator may be made. In response additional memory may be allocated or denied based on the availability of memory within the statement execution block.

In other embodiments, a policy for allocating memory to various processes may be dynamic, and cause memory allocators to allocate memory upon request depending on which process makes the request and relevant workload conditions. For example, a policy may cause a memory allocator to evaluate how much total unallocated memory remains available, and grant or deny the requested allocation based on the priority of the requesting process. When the total available unallocated memory falls below a threshold, the memory allocator may deny a requested allocation of memory to statement execution related processes, and yet grant a request for a similar amount of memory to database replication processes having a higher priority under the policy than statement execution processes.

In yet other embodiments, memory allocation may rely on memory allocation limit objects to allocate memory in a dynamic fashion. The purpose of the limit object is to limit the peak memory size allocated by all threads limited by the particular limit object. Thus, a policy may allocate memory to a statement execution process relying on a statement execution limit object, and the policy may allocate memory to a database replication process relying on a replication limit object. The memory allocators may refer to the requesting process in determine which policy to apply, or the requesting process may identify which limit object is associated with the process under the policy. In other words, the allocator may access the policy during runtime or the policy may be effected within the various DBMS components themselves, or the policy may include a combination of approaches. The policy may also allow for special conditions, such as race conditions, when one or more policy limits may be relaxed or temporarily ignored.

An exemplary limit object in a multicore processor environment, such as processor 550, has two values: a specified limit L and a delta value D. The exemplary limit object also has a set of slot objects, one for each logical core. Each slot object includes a temporary limit value T and memory used value U. The slot data may alternatively be striped via logical cores for performance reasons. When a statement is received by a secondary database the memory allocator may pass the statement handling process, e.g. within process control 550, a pointer to the statement limit object. The value L is set and indicates the limit on peak memory allocated to all statements executing within the secondary database system 510. And, all statements executing within the secondary database are limited by L by virtue of being limited by the same statement limit object. Initially U and T are unsigned integers initialized with zero (0).

When a request for allocation is made to a memory allocator relying on limit objects, the allocators check to see if a limit object exists for the requesting process. In embodiments the limit objects may be maintained in thread local storage and the memory allocator checks to see if a corresponding limit object is set in thread local storage. If a corresponding limit object does not exist, the allocator may deny the request or grant the request depending on the policy.

If a corresponding limit object does exist, the allocator will evaluate the appropriate slot of the limit object corresponding to the logical core(s) in which the process or thread is executing to obtain U and T. For example, if an allocation request is for s bytes, the allocator will perform a check to determine if $U+s \leq T$, and if the check is successful the allocator will increment U by s. If $U+s \leq T$ fails, then the algorithm sums up all the values U in all the slots of the limit object to obtain S, the total used size of processes in each logical core limited by the limit object. Thus, for j slots, $\Sigma U_j = S$. The allocator then performs a second check to determine if $S+s+D \leq L$. If this check succeeds, then the temporary slot limit T is incremented by s+D, and U is incremented by s, the requested allocation. If this second check $S+s+D \leq L$ fails, the allocation fails and the limit object remains unchanged. In this way, memory allocation is managed dynamically as needed on a per statement basis yet confined to the limit object limit L. Memory allocation policies may rely on either S, or a sum of all $T_j$, i.e. $\Sigma T_j$, or both when determining whether a request for allocation will succeed.

When statement execution is complete, the statement handling process may initiate a deallocation process by informing the memory allocator that the memory is no longer needed. For example, the processes may pass the pointer back to the allocator causing the memory to deallocate. In embodiments the pointer is passed to a free function which deallocates the memory making it available to the memory allocators. In other embodiments the allocation is automatically freed when a process ends. In embodiments relying on limit objects deallocation may require a request to the memory allocator, which may deallocate memory in an algorithmic fashion. For example, if the limit object is similar to the limit object discussed above, the memory allocator may check if $U-s>T-D$, and if the check succeeds, U is decremented by s, the freed memory size. If this deallocation check fails, the allocator sets $T=U-s+D$.

In embodiments, a client 515 issues a statement, e.g. a read statement 525, to the secondary database. When the client statement 525 is received by a secondary database system 510, a statement execution process executing in processor 550 requests an allocation of memory 540 from a memory allocator executing in processor 550. If the allocation is granted, the statement execution process continues execution in processor 550 supported by the allocated portion of the memory 540 and a return is generated and returned to the client for further handling or processing. If the allocation is denied, a return is generated by processor 550 including information indicative of the out of memory condition in the secondary database system 510, and the return is sent to the client for further handling or processing. For example, the client 515 may initiate fallback processes of the client application library and thereby execute the statement in the primary system when the secondary system returns an out of memory condition.

In embodiments, the HA/DR system 500 is engaged in load balancing operations. A client in HA/DR system 500 issue a statement by default to the primary database system 505. Load balancing processes executing on processor 545 determine that the statement may be load balanced, and thereby routed to the secondary database 510 for execution. In some embodiments, the client application library informs the client 515 which statements can be routed, and the client 515 appends routing information to statements issued to the primary system 505 to indicate which statements may be routed through load balancing operations to a secondary database for execution and under what conditions. A primary system 505 receiving a client statement including routing information will evaluate whether the statement may be routed based on the routing information.

When the primary system determines that the statement may be routed, it responds to the client informing the client to request the secondary system 510 attempt to execute the statement. A statement execution process executing in processor 550 will attempt to execute the statement, and requests an allocation of memory 540 from a memory allocator executing in processor 550. If the allocation is granted the statement execution process continues execution in processor 550 supported by the allocated portion of the memory 540 and a return is generated and returned to the client for further handling or processing. If the allocation is denied, a return is generated by processor 550 including information indicative of the out of memory condition in the secondary database system 510, and the return is sent to the client to initiate fallback processing. The client informs the primary system of the fallback condition and requests that the primary system execute the statement in the primary system.

In some embodiments, only read statements may be routed by load balancing operations. In other embodiments, only certain non-critical statements may be routed by load balancing operations. Whether a statement may be routed will depend in part on the needs, demands and priority or criticality of the client application and the determinations of the system architect.

In embodiments the DBMS may track or monitor the memory allocated to various statements for reporting and visibility purposes. When an allocator allocates memory, the DBMS may independently maintain the amount of memory 540 allocated to each statement or DBMS process in processor control 560 executing in processor 550. Alternatively, the DBMS may poll the allocators or a limit object to gather information about memory usage for the reporting and visibility purposes.

Figure 6:
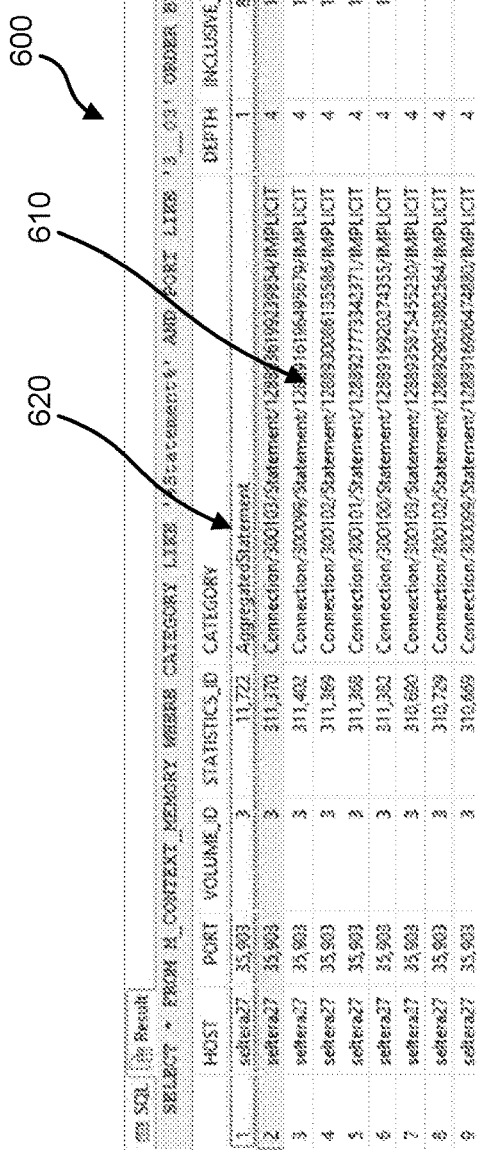
FIG. 6 is a diagram illustrating an exemplary report of statement memory usage in accordance with the current subject matter.

FIG. 6 illustrates an exemplary report 600 of statement memory usage generated by a DBMS process executing in a database system. Report 600 includes eight rows 2-9 corresponding to individual statement execution memory allocation referred to by connection and by statement identifier, for example row 610. Each row reports various elements of information including the currently used memory (INCLUSIVE_SIZE_IN_USE) and the total allocated memory for each statement (INCLUSIVE_ALLOCATED_SIZE). Report 600 also includes a single row 620 reporting the aggregated statement memory consumption value, including the sum of INCLUSIVE_SIZE_IN_USE for each reported statement and the sum of INCLUSIVE_ALLOCATED_SIZE for each reported statement. In embodiments, a report is generated and dumped to a log file each time an out of memory condition is encountered in response to a request for allocation.

FIG. 7 is a process flow diagram illustrating an arrangement in which, at 710, a secondary database system receives a statement requesting database operations in the secondary database system. The secondary database system is mirroring data stored in the primary database system as part of a HA/DR system. The secondary database systems is also supporting the workload of the primary system by executing statements routed to the secondary database system by load balancing processes of the HA/DR system. Thereafter, at 720, a process of the secondary database system requests an allocation of memory to support the database operations requested by the statement. The secondary database system, at 730, generates an aggregated statement memory consumption value indicating the total amount of memory used by, or allocated to, processes handling execution of statements in the secondary database system. Based on the aggregated statement memory value, at 740, the secondary database system evaluates whether the requested allocation will exceed a total statement execution memory limit. Further, based on the evaluation, at 750, the secondary database system denies the requested allocation.

FIG. 8 is a process flow diagram illustrating an arrangement in which, at 810, a client within an HA/DR system with load balancing, sends or issues a statement requesting database operations to a primary database system. The client interacts with a primary database system that has an associated secondary database system mirroring data stored in the primary database system. Thereafter, at 820, the client receives a response from the primary database instructing the client to attempt to execute the statement in the secondary database. The client, at 830, the sends the statement to the secondary database for execution. Subsequently, at 840, the client receives a response from the secondary database indicating that the attempted execution has failed as a result of an out of memory condition. Responsive to the response from the secondary database, at 850, the client requests that the primary database execute the statement.

FIG. 9 is a process flow diagram illustrating an arrangement in which, at 910, a primary database system generates transaction logs containing records of database operations executed in the primary database system. The primary database system has an associated secondary database system mirroring the data stored in the primary database and providing workload service as part of a load balancing operation. Thereafter, at 920, the primary database system sends the transaction logs to the secondary database system for replay in order to mirror the data stored in the primary database. Concurrently with the generation and sending of transaction logs, at 930, the primary database routes a statement requesting database operations to the secondary database system. Thereafter, the primary database system receives, at 940, an out of memory condition from the secondary database, and at 950, the primary database system executes the statement.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more computer processors forming part of at least one computing device, the method comprising:
    sending, by one or more computer processors, a statement requesting database operations to a primary database system, the primary database system engaged in load balancing operations with a secondary database system;
    receiving, by the one or more computer processors, a response, responsive to the sent statement, from the primary database system including information instructing that the secondary database system attempt to execute the statement;
    sending, by the one or more computer processors, responsive to receiving the response, the statement to the secondary database system;
    receiving, by the one or more computer processors, an out of memory condition from the secondary database system indicative that the secondary database system has exhausted memory allocated to executing statements; and
    sending, by one or more computer processors, the statement to the primary database system for execution.

2. The method for implementation by one or more computer processors of claim 1 further comprising:
    generating, by one or more computer processors, the statement responsive to a client application of a database of the first database system; or
    generating, by one or more computer processors, the statement responsive to a database management system (DBMS) application.

3. The method for implementation by one or more computer processors of claim 2, wherein generating the statement includes associating routing information with the statement, the routing information indicating that the statement is load balanced.

4. A method for implementation by one or more computer processors forming part of at least one computing device, the method comprising:
    executing, by one or more computer processors, a plurality of statements in a primary database system;
    generating, by one or more computer processors, output from a plurality of database operations associated with the plurality of statements;
    sending, by one or more computer processors, the output to a secondary database system for replication thereby enabling the secondary database system to support load balancing operations of the primary database system;
    receiving, by one or more computer processors, a client application statement requesting additional database operations;
    routing, by one or more computer processors, the client application statement to the secondary database system to be executed in support of the load balancing operations;
    receiving, by one or more computer processors, an out of memory condition indicating that the secondary database system has consumed all memory resources allocated to load balancing operations; and
    executing, by one or more computer processors, the additional database operations requested by the client application statement in the primary database system.

5. The method of claim 4, further comprising:
receiving, by one or more computer processors, a second client application statement requesting second additional database operations; and
routing, by one or more computer processors, the second client application statement to the secondary database system to be executed in support of the load balancing operations; and
executing the second client application statement in the secondary database system.

6. The method of claim 5, further comprising:
evaluating, by one or more computer processors, an aggregated statement memory consumption value indicating total memory consumed by the secondary database, wherein the routing of the client application statement and the second client application statement is based on the evaluation.

7. The method of claim 6, further comprising:
requesting, by one or more computer processors, the aggregated statement memory consumption value from the secondary database system.

8. The method of claim 7, further comprising:
responsive to the evaluating the aggregated statement memory consumption value, executing a third client application statement in the primary database system.

9. A system comprising:
one or more computer processors; and
memory storing instructions which when executed by the one or more computer processors result in operations comprising:
executing a plurality of statements in a primary database system;
generating output from a plurality of database operations associated with the plurality of statements;
sending the output to a secondary database system for replication thereby enabling the secondary database system to support load balancing operations of the primary database system;
receiving a client application statement requesting additional database operations;
routing the client application statement to the secondary database system to be executed in support of the load balancing operations;
receiving an out of memory condition indicating that the secondary database system has consumed all memory resources allocated to load balancing operations; and
executing the additional database operations requested by the client application statement in the primary database system.

10. The system of claim 9, wherein the operations further comprise:
receiving a second client application statement requesting second additional database operations; and
routing the second client application statement to the secondary database system to be executed in support of the load balancing operations; and
executing the second client application statement in the secondary database system.

11. The system of claim 10, wherein the operations further comprise:
evaluating an aggregated statement memory consumption value indicating total memory consumed by the secondary database, wherein the routing of the client application statement and the second client application statement is based on the evaluation.

12. The system of claim 11, wherein the operations further comprise:
requesting the aggregated statement memory consumption value from the secondary database system.

13. The system of claim 12, wherein the operations further comprise:
responsive to the evaluating the aggregated statement memory consumption value, executing a third client application statement in the primary database system.

14. A non-transitory computer program product storing instructions which, when executed by one or more computer processors forming part of at least one computing device result in operations comprising:
executing a plurality of statements in a primary database system;
generating output from a plurality of database operations associated with the plurality of statements;
sending the output to a secondary database system for replication thereby enabling the secondary database system to support load balancing operations of the primary database system;
receiving a client application statement requesting additional database operations;
routing the client application statement to the secondary database system to be executed in support of the load balancing operations;
receiving an out of memory condition indicating that the secondary database system has consumed all memory resources allocated to load balancing operations; and
executing the additional database operations requested by the client application statement in the primary database system.

15. The non-transitory computer program product of claim 14, wherein the operations further comprise:
receiving a second client application statement requesting second additional database operations; and
routing the second client application statement to the secondary database system to be executed in support of the load balancing operations; and
executing the second client application statement in the secondary database system.

16. The non-transitory computer program product of claim 15, wherein the operations further comprise:
evaluating an aggregated statement memory consumption value indicating total memory consumed by the secondary database, wherein the routing of the client application statement and the second client application statement is based on the evaluation.

17. The non-transitory computer program product of claim 16, wherein the operations further comprise:
requesting the aggregated statement memory consumption value from the secondary database system.

18. The non-transitory computer program product of claim 17, wherein the operations further comprise:
responsive to the evaluating the aggregated statement memory consumption value, executing a third client application statement in the primary database system.

\* \* \* \* \*